US008472692B2

(12) United States Patent
Rughani et al.

(10) Patent No.: US 8,472,692 B2
(45) Date of Patent: Jun. 25, 2013

(54) METHOD AND APPARATUS FOR CONTROLLING A MICROSCOPE

(75) Inventors: Daxa Neykumar Rughani, Hertfordshire (GB); Martin Philip Gouch, Hertfordshire (GB)

(73) Assignee: FFEI Limited, Hertfordshire (GB)

( * ) Notice: Subject to any disclaimer, the term of this patent is extended or adjusted under 35 U.S.C. 154(b) by 837 days.

(21) Appl. No.: 12/685,167

(22) Filed: Jan. 11, 2010

(65) Prior Publication Data

US 2010/0177189 A1 Jul. 15, 2010

(30) Foreign Application Priority Data

Jan. 9, 2009 (GB) .................................. 0900354.2

(51) Int. Cl.
*G06K 9/00* (2006.01)
(52) U.S. Cl.
USPC ........................................... 382/133; 348/79
(58) Field of Classification Search
USPC ........................................... 382/133; 348/79
See application file for complete search history.

(56) References Cited

U.S. PATENT DOCUMENTS

2005/0089208 A1* 4/2005 Dong et al. .................. 382/133

FOREIGN PATENT DOCUMENTS

| WO | 9641137 A1 | 12/1996 |
| WO | 2006023675 A2 | 3/2006 |

* cited by examiner

*Primary Examiner* — Sath V Perungavoor
*Assistant Examiner* — Jeffery Williams
(74) *Attorney, Agent, or Firm* — Sughrue Mion, PLLC (57) ABSTRACT

In accordance with the present invention there is provided a method for controlling a microscope to scan a microscope slide. By analyzing an overview image it is determined quantatively which swathe contains the most image detail and an optimum scanning order can subsequently be determined relative to the swathe determined as having the most detail. By scanning the swathe with the most detail first a good focus characteristic can be established for a dynamic focussing system and prediction errors in the dynamic focus system are likely to be low when scanning subsequent swathes.

35 Claims, 9 Drawing Sheets

| Swathe | Bin 0 | 1 | 2 | 3 | 4 | 6 | 7 | 8 | 9 | 10 | 11 | Sum |
|---|---|---|---|---|---|---|---|---|---|---|---|---|
| 0 | 0 | 0 | 0 | 0 | 0 | 9 | 0 | 0 | 0 | 0 | 0 | 75 |
| 1 | 0 | 0 | 0 | 0 | 51 | 77 | 77 | 58 | 0 | 0 | 0 | 493 |
| 2 | 0 | 0 | 0 | 70 | 77 | 77 | 77 | 77 | 76 | 21 | 0 | 705 |
| 3 | 0 | 3 | 7 | 76 | 77 | 77 | 77 | 77 | 76 | 77 | 5 | 804 |
| 4 | 0 | 70 | 7 | 48 | 57 | 77 | 77 | 77 | 76 | 77 | 77 | 947 |
| 5 | 41 | 3 | 0 | 21 | 77 | 77 | 21 | 77 | 64 | 77 | 35 | 859 |
| 6 | 43 | 7 | 32 | 73 | 77 | 69 | 77 | 77 | 76 | 64 | 5 | 899 |
| 7 | 11 | 57 | 13 | 76 | 66 | 77 | 77 | 77 | 69 | 73 | 75 | 909 |
| 8 | 0 | 53 | 24 | 76 | 4 | 77 | 71 | 7 | 0 | 0 | 3 | 542 |
| 9 | 0 | 0 | 26 | 59 | 77 | 77 | 0 | 0 | 0 | 0 | 0 | 395 |

*FIG. 7a*

| Swathe | Bin 0 | 1 | 2 | 3 | 4 | 6 | 7 | 8 | 9 | 10 | 11 |
|---|---|---|---|---|---|---|---|---|---|---|---|
| 0 | 0 | 5 | 10 | 20 | 39 | 48 | 39 | 39 | 20 | 15 | 6 |
| 1 | 0 | 10 | 20 | 39 | 77 | 77 | 77 | 77 | 39 | 30 | 11 |
| 2 | 0 | 19 | 39 | 77 | 77 | 77 | 77 | 77 | 77 | 60 | 22 |
| 3 | 0 | 38 | 77 | 77 | 77 | 77 | 77 | 77 | 77 | 77 | 44 |
| 4 | 0 | 70 | 7 | 48 | 57 | 77 | 77 | 77 | 76 | 77 | 77 |
| 5 | 41 | 38 | 4 | 45 | 77 | 77 | 60 | 77 | 77 | 77 | 74 |
| 6 | 64 | 26 | 34 | 77 | 77 | 77 | 77 | 77 | 77 | 77 | 42 |
| 7 | 43 | 70 | 30 | 77 | 77 | 77 | 77 | 77 | 77 | 77 | 77 |
| 8 | 22 | 77 | 39 | 77 | 43 | 77 | 77 | 46 | 39 | 39 | 42 |
| 9 | 11 | 39 | 46 | 77 | 77 | 77 | 39 | 23 | 20 | 20 | 21 |

METHOD AND APPARATUS FOR CONTROLLING A MICROSCOPE

FIELD OF THE INVENTION

The present invention relates to a method and apparatus for controlling a microscope to scan a microscope slide. In particular, the invention relates to scanning a microscope slide in swathes and determining an efficient order in which to scan the swathes so that good focus can be maintained throughout a scan.

BACKGROUND OF THE INVENTION

Conventional microscope scanners scan microscope slides using a line charge coupled device (CCD) of fixed width typically in the order of about 1.28 mm when scanning at 40× magnification. To accommodate scanning of slides greater than 1.28 mm wide a slide has to be scanned in multiple, slightly overlapping swathes. The scanner has the ability to maintain focus dynamically as a scan progresses but in order to do so it requires an initial seed focus for a given swathe. An autofocus procedure is responsible for determining the initial seed focus position for a given swathe to initialise the dynamic focus tracking system. The autofocus procedure however, adds time delays which increases the scanning time and, therefore, reduces the productivity of the scanner.

Further, biological specimens typically have circular or elliptical structures which have little detail at the edges of an image. Thus conventional scanning from one edge of the slide to the next is unlikely to work effectively as prediction errors from the dynamic focus procedure are likely to be large from, for example, the first swathe to the second swathe as the first swathe may have little or no detail.

It is, therefore, desirable to have an improved scanning method that increases the probability of getting a successful scan of a slide in focus and to reduce the number of autofocus steps required per sample.

SUMMARY OF THE INVENTION

In accordance with the present invention there is provided a method for controlling a microscope to scan a microscope slide comprising scanning a predetermined area of a microscope slide to generate an overview image; dividing said overview image into a plurality of adjacent swathes each swathe having a length equal to the length of the predetermined area and a predetermined width; calculating for each swathe a detail value that relates to the level of image detail in the swathe; determining which swathe has the largest detail value and designating the swathe having the largest detail value as a first swathe; further scanning the predetermined area by scanning the first swathe and subsequently scanning the remaining swathes in a predetermined order relative to the first swathe.

In accordance with a further aspect of the present invention there is provided an apparatus for controlling a microscope to scan a microscope slide comprising scanning means operable to scan a predetermined area of a microscope slide to generate an overview image; dividing means operable to divide an overview image into a plurality of adjacent swathes each swathe having a length equal to the length of the predetermined area and a predetermined width; detail value calculation means operable to calculate for each swathe in an overview image a detail value that relates to the level of image detail in the swathe; determination means operable to determine which swathe in an overview image has the largest detail value and designating the swathe having the largest detail value as a first swathe; wherein the scanning means is further operable to scan the predetermined area by scanning a first swathe and subsequently scanning the remaining swathes in a predetermined order relative to the first swathe.

By analysing an overview image it can be determined quantatively which swathe contains the most image detail and an optimum scanning order can subsequently be determined relative to the swathe determined as having the most detail. By scanning the swathe with the most detail first a good focus characteristic can be established for a dynamic focussing system and prediction errors in the dynamic focus system are likely to be low when scanning subsequent swathes.

BRIEF DESCRIPTION OF THE DRAWINGS

An example of a method for controlling a microscope to scan a specimen and an example of a system for performing the same according to the present invention will now be described with reference to the accompanying drawings, in which:

FIG. 4b is an illustration showing the pixels that make up a line in a swathe of FIG. 4a;

DETAILED DESCRIPTION OF THE INVENTION

Figure 1:
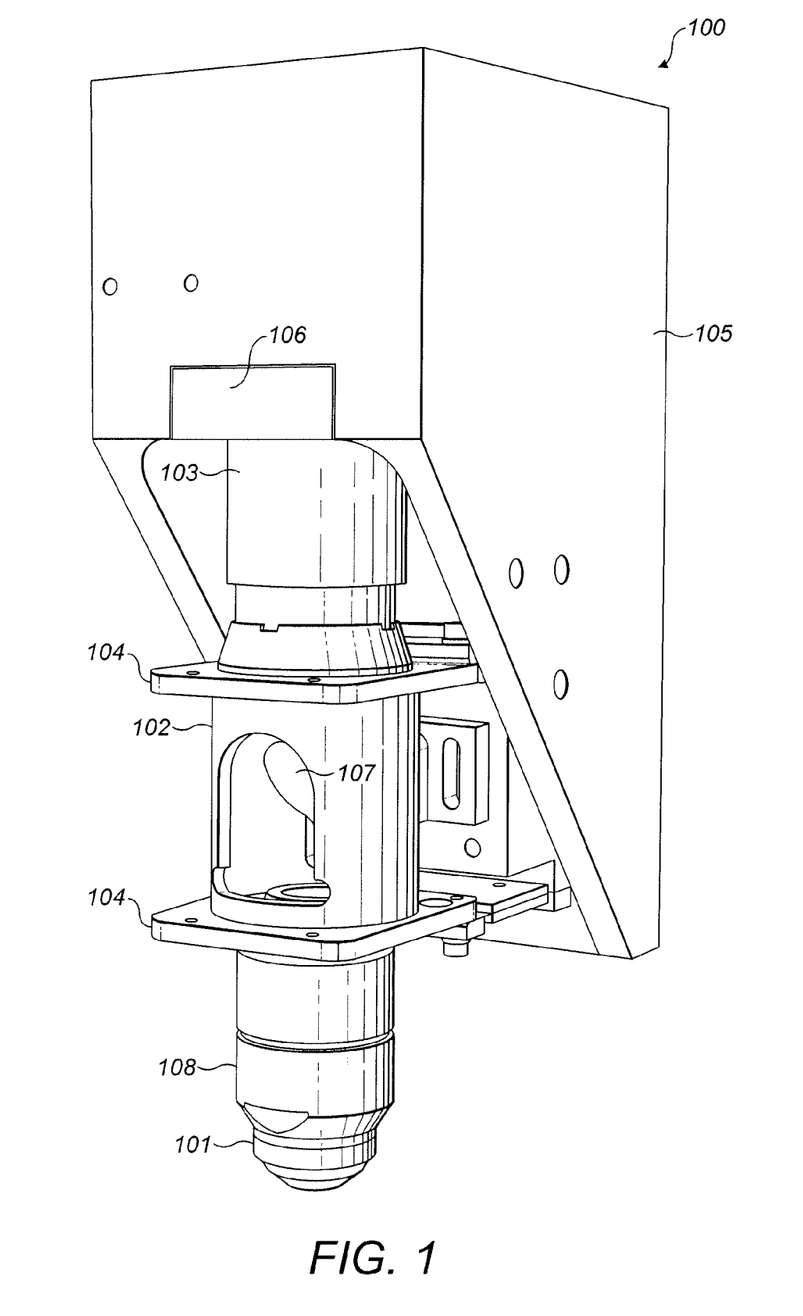
FIG. 1 is a perspective view from one side of an exemplary microscope lens support assembly that may be used in conjunction with the present invention.

An example of a microscope objective lens support assembly for use with the method and system of the present invention is shown in FIG. 1. Such a system is shown for example only and different configurations that comprise a different type of microscope lens and/or different drive mechanisms may also be used. The objective lens support assembly 100 of FIG. 1 has an objective lens 101 mounted at the bottom of the assembly. The objective lens 101 is supported in a barrel 108 and is typically held in position within the barrel 108 by a screw thread. The barrel 108 is then also mounted within a main body 102 of the lens assembly using a second screw thread. The main body 102 is located above the objective microscope lens 101 and contains a mirror 107. The mirror is angled so as to reflect light from the main body 102 into suitably configured receiving apparatus (not shown). The main body 102 is mounted between two leaf springs 104 which can flex to allow the main body 102 to substantially move along a linear axis defined by the vertical.

Above the main body 102 is mounted a linear actuator in the form of a voice coil actuator 103. This voice coil actuator is typically a standard "off the shelf" item, in this example manufactured by BEI Technologies Inc. The voice coil actuator 103 is mounted directly above the main body 102 so that the centre of gravity of the main body 102, the lens 101 and the voice coil actuator 103 are collinear. This then places the centre of gravity of all components directly upon the linear axis 115 along which the voice coil actuator provides movement. Above the voice coil actuator 103 is mounted a voice coil actuator adjustment block 106. This adjustment block 106 allows the mechanical and dynamic properties of the voice coil actuator to be tailored to a specific lens assembly. The leaf spring 104 and the voice coil adjustment block 106 are both mounted to voice coil 105. This bracket is typically made from a close grained grey cast iron which provides a dense material to dampen any unwanted vibrations and to resist compaction under an upwards or recoil force generated by the voice coil actuator 103. Control means (not shown) are provided in the microscope 100 for controlling the actuator and the position of the lens.

Figure 2:
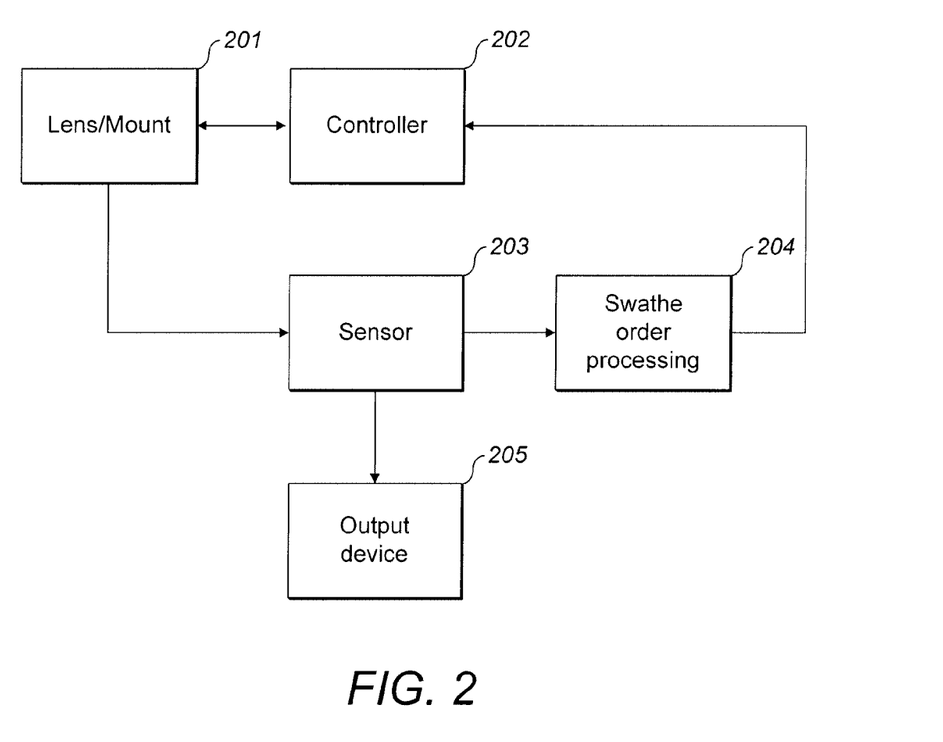
FIG. 2 is a block diagram showing the functional components of a lens control system in accordance with the present invention.

FIG. 2 shows a block diagram of the functional components of the microscope that make up the control system for controlling the focus position of the lens during a scan. The lens and mount are collectively referred to as block 201 which is connected to a controller 202 which is operable to detect and control the position of the lens within the barrel. A sensor 203 is operable to receive light received and focussed by the lens and generate a corresponding digital image of low or high resolution. The output of the sensor 203 is connected to the input of a swathe order processing unit 204. The swathe order processing unit 204 is configured to take a low resolution overview image generated by the sensor 203 and analyse the image to determine an optimum order in which the swathes of the image should be scanned for a high resolution scan. In addition, it also operable to determine a seed focus position within each swathe at which the autofocus procedure is performed by the controller 202 to determine the initial seed focus position of the lens to initialise the dynamic focus procedure. The sensor 203 is further connected to an output unit which may comprise, for example, a display or storage means for viewing or storing the result of a scan performed by the microscope.

The swathe order processing unit 204 is connected to an input of the controller 202. The swathe order unit 204 sends data comprising the order in which the swathes should be scanned and corresponding seed focus positions for each swathe to the controller. The controller 202 is operable to control the lens and mount assembly 201 to perform a scan in accordance with the swathe order and focus seed position data received from the swathe order processing unit 204.

Figure 3:
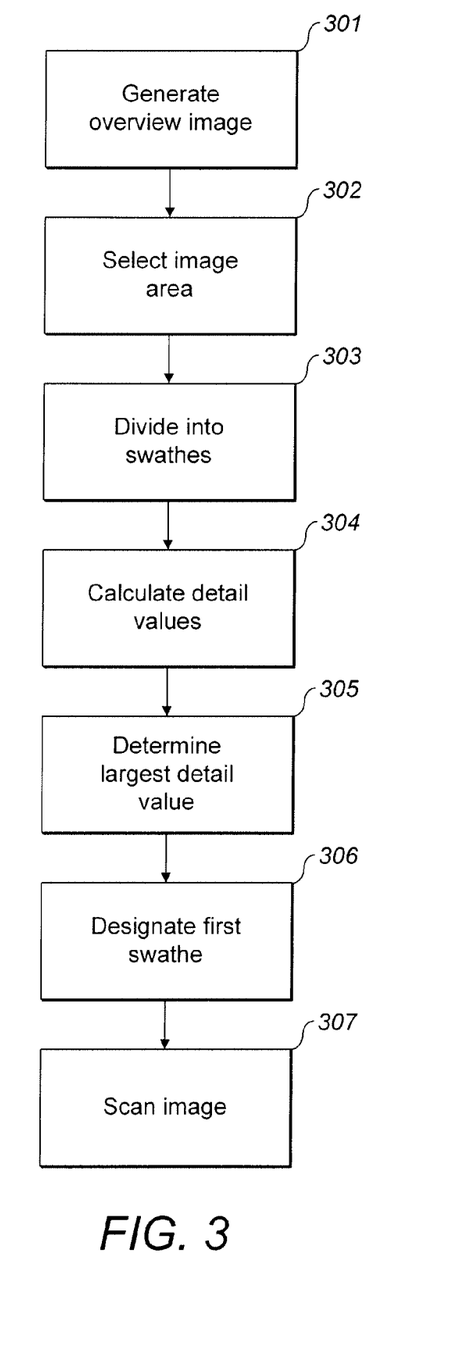
FIG. 3 is a flow chart showing a method for performing a scanning operation of a microscope.

Operation of the swathe order unit to perform a method of scanning a microscope slide shall now be described with reference to the flow diagram shown in FIG. 3. The first step 301 is to generate a low resolution 'overview' image of the microscope slide. The resolution in this embodiment is 60.833 lines/mm but as will be appreciated other resolutions are also possible. The lens used in the microscope to obtain the overview image has a large depth of field and thus it is possible to obtain a satisfactory low resolution image for analysis without further focus control. In the next step 302 a scan area of interest is selected from within the overview image. In this embodiment a scanner operator manually identifies the scan area to be scanned by viewing the overview image on a display and using a crop area tool to select a rectangular area of interest. However, as will be appreciated in other embodiments the selection of an area to be scanned may be performed automatically by the swathe order processing unit 204 itself identifying a region of the slide containing detail.

Figure 4A:
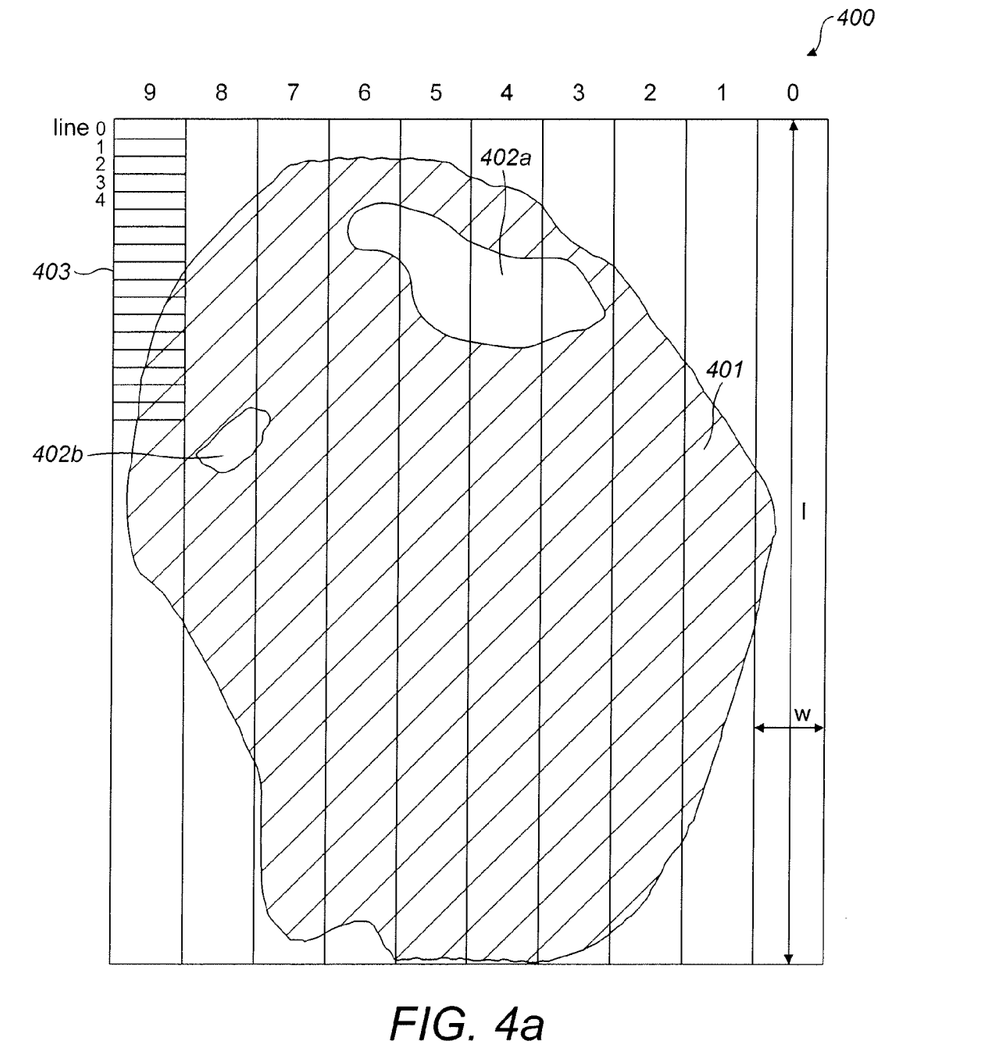
FIG. 4a is a drawing showing an example image divided into swathes.

Next at step 303 the selected image is divided into a plurality of adjacent swathes. Each swathe extends across the length of the selected area and has a predetermined width in pixels. The number of swathes to be scanned is determined from the width of the selected area identified by the operator. FIG. 4 shows an example of an overview image 400 that has been generated from an area of a slide that has been selected and subsequently scanned and divided into swathes. The image comprises a shaded area corresponding to a specimen with two un-shaded gap regions 402a and 402b formed within the body of the specimen. The image area has been divided up into 10 vertical swathes which have been allocated the numbers 0-9 taken from right to left of the image. Each swathe is w pixels in width and is l pixels in length. For the avoidance of doubt the terms 'left', 'right', 'top' and 'bottom' as used hereinafter refer to the said directions with respect to the orientation of the image shown in FIG. 4.

Returning to FIG. 3 the next step 304 is to calculate detail values for each swathe. A detail value in this context is a metric relating to the level of image detail in a swathe. Thus, a swathe that covers an area of the slide containing no specimen will be blank and have a low or zero detail value while a swathe covering an area with a large amount of specimen will have a high detail value. For example, turning once again to FIG. 4, swathe number 4 would have a high detail value and swathe 0 a low detail value. Further description of the calculation of detail values for each swathe is given further below.

Once detail values have been determined for all of the swathes it is determined which swathe has the largest detail value (step 305). The swathe having the largest detail value is then assigned at the first swathe to be scanned during a dynamic focus high resolution scan (step 306). Finally the image is scanned at high resolution with the focus of the lens 201 being controlled in accordance with a dynamic focus procedure by the controller 202. In this particular embodiment the order in which the swathes are scanned begins at the designated first swathe and then proceeds by scanning each swathe to the left of the first swathe until the last swathe at the edge of the selected area is reached. For example, in FIG. 4, if swathe number 4 was designated as the first swathe then scanning would continue by scanning swathes 5 to 9 at which point the edge of the selected area would be reached. At this point scanning proceeds from the swathe immediately to the right of the first swathe and continues swathe by swathe until the right edge of the image is reached. Continuing our example, the next swathe to be scanned after swathe 9 would be swathe 3 and scanning would proceed from swathe 3 to swathe 0. As part of the scanning process for each swathe the controller auto-focuses the microscope at a calculated seed focus position within each swathe. Calculation of the auto-focus position for each swathe is explained in further detail below.

Figure 4B:
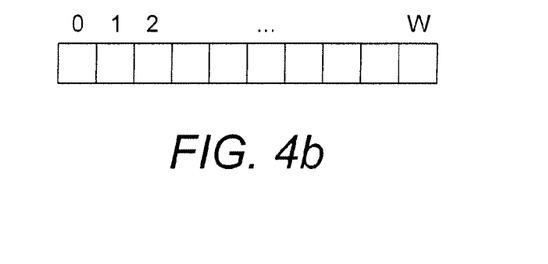
Figure 5:
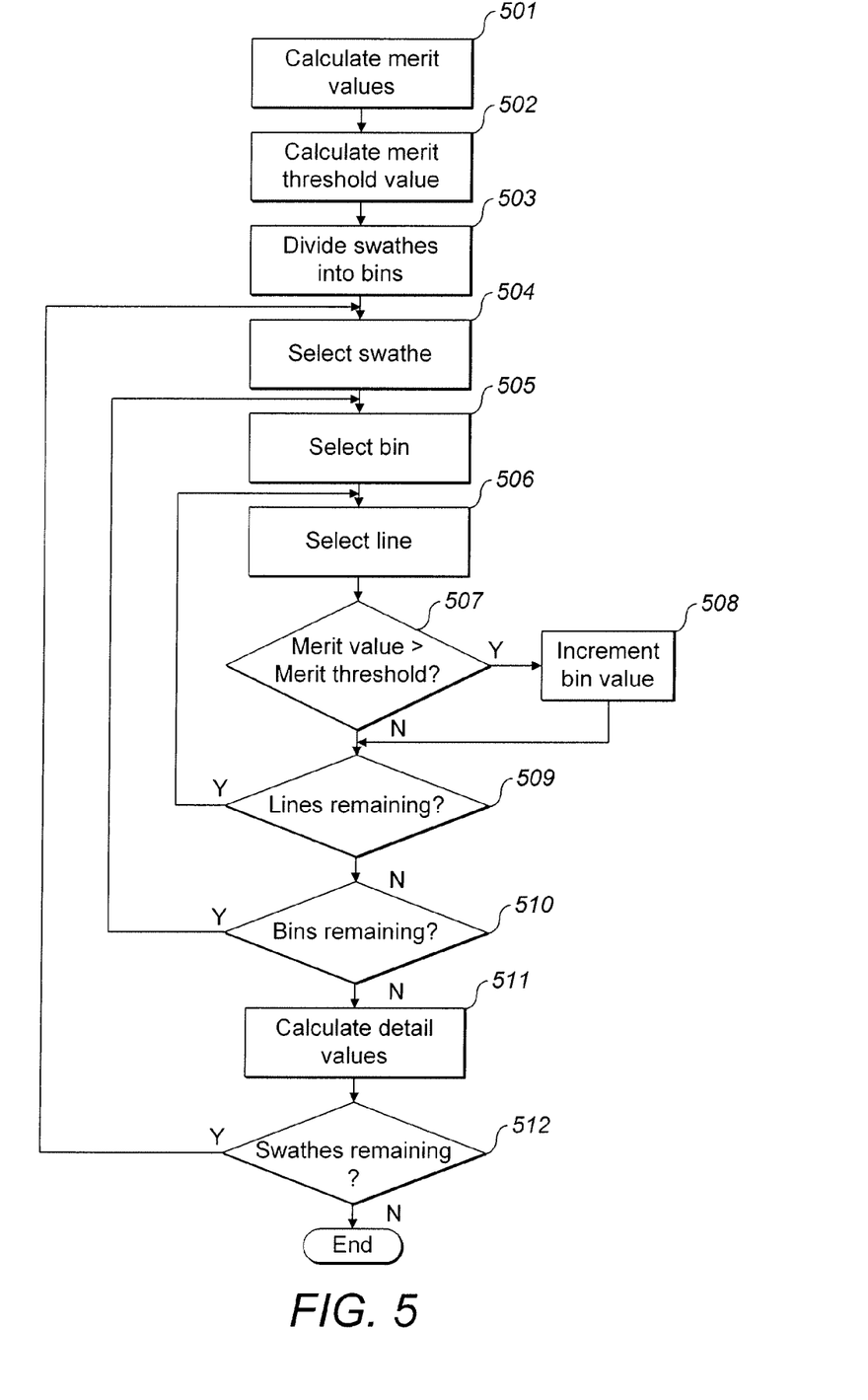
FIG. 5 is a flow chart showing the steps performed to calculate detail values for each swathe.

Calculation of the detail values for each swathe will now be described in detail with reference to the flow chart set out in FIG. 5. The first step 501 is to calculate merit values for each line in each swathe of the selected area. A merit value is a metric that relates to the amount of detail determined from the contrast between and the level of shading of pixels within a line across the width of the swathe. FIG. 4 shows an example where swathe 9 has been divided into lines 403 (note that for clarity not all the lines within the swathe are shown and, further, lines of adjacent swathes are not shown). In addition, FIG. 4b shows the individual pixels 0 to w that comprise the line 0 of FIG. 4a. Each merit value is calculated in accordance with the following expression:

$$meritvalue[\text{swathe}][\text{line}] = \sum_{n=0}^{n=w-2} (C_{n+1} - C_n)^2 + 765 - R_n - G_n - B_n \quad (1)$$

wherein,
'swathe' is a number identifying a swathe being analysed,
'line' is a number identifying the line within the swathe being analysed,
'n' is a number of a pixel within the line,
'w' is the total number of pixels in the line,
'Rn', 'Gn' and 'Bn' are respective red, green and blue 8-bit colour channel values for the nth pixel, and
'Cn' is a red or green or blue 8-bit colour channel value for the nth pixel.

In alternative embodiments the following expressions (1a), (1b) or (1c) may alternatively be used in order to calculate merit values.

$$meritvalue[\text{swathe}][\text{line}] = \sum_{n=0}^{n=w-2} (C_{n+1} - C_n)^2 \quad (1a)$$

wherein, Cn, n and w have the meanings given above for equation (1)

$$meritvalue[\text{swathe}][\text{line}] = \sum_{n=0}^{n=w-2} C_n - M_n - Y_n \quad (1b)$$

wherein, Cn, Mn, Yn are subtractive primaries cyan, magenta and yellow for the nth pixel. Alternatively, a further simplified transform may simply be calculated as 255-Rn, 255-Gn or 255-Bn.

Thus, in this way an array of values meritvalue[swathe][line] is generated that contains merit values for every line in every swathe of the image that can be indexed by swathe and line number. The lines are numbered from 0 to n starting at the top of the image and the swathes numbered from 0 to m starting from the right of the image. Where n is the length of the image from top to bottom in pixels and m is the total number of swathes.

Figure 6:
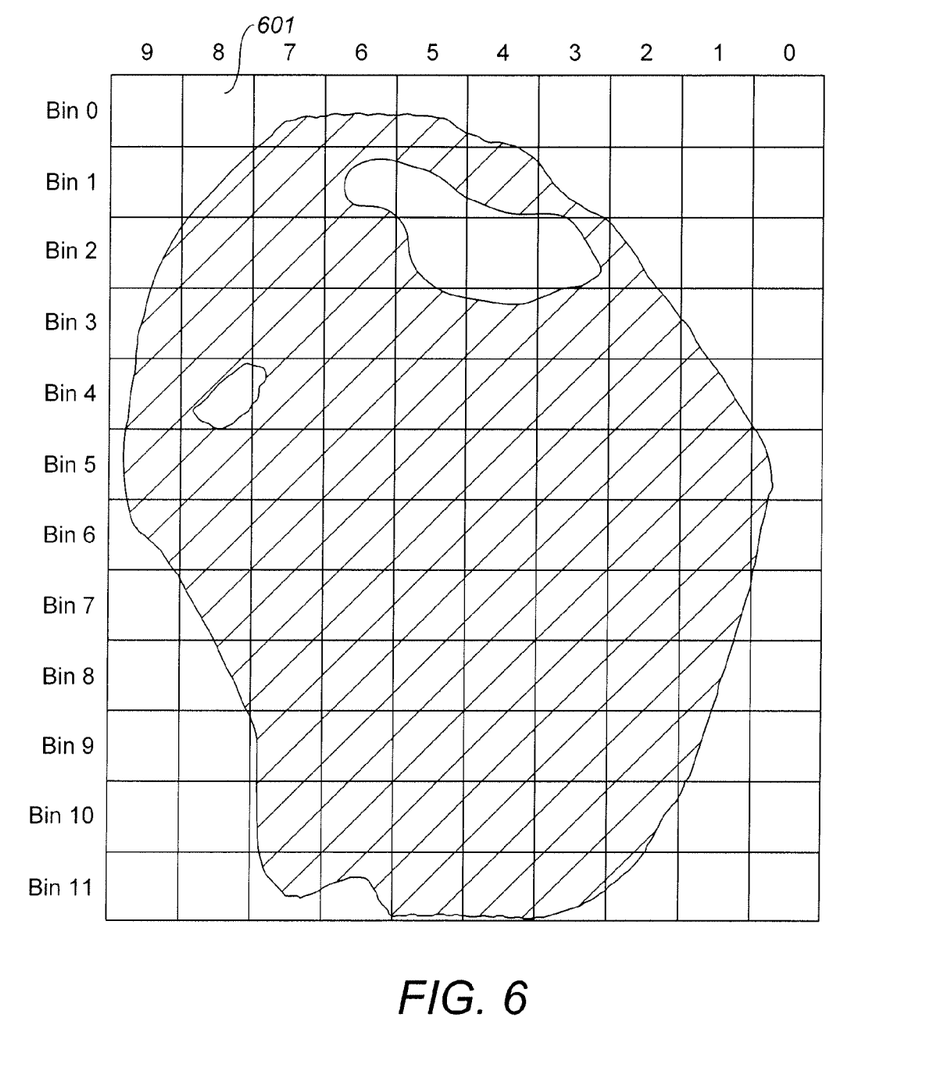
FIG. 6 is a drawing corresponding to the image of FIG. 4 showing the swathes of the image divided into bins.

Once the merit values have been calculated the calculation process continues at step 503 where the swathes are subdivided into adjacent bins. Each bin is equal in size and comprises a fixed number of swathe lines. In this embodiment the length of each bin is equal to the width in pixels of a swathe, however, as will be appreciated other lengths are possible. The reasoning for using a bin size equal to the swathe width is that focus should be similar for all pixels within that area. Each swathe has an equal number of corresponding bins. The division of the image area into bins is illustrated in FIG. 6 where the bins are labelled from 0 to 11 from the top of the image and as an example 601 is bin 0 of swathe 8.

In the next step 504 a swathe to be analysed is selected. The swathes are analysed sequentially from the right most swathe 0 to the left most swathe 9 although as will be appreciated for the purposes of this particular calculation the order is unimportant. Once a swathe is selected the next step 505 is to select a bin for processing. Processing begins with bin 0 and continues with selection of a line within the bin at step 506. Lines are selected from within the bin starting with the first line at the top of the bin and proceeding through to the last line at the bottom of the bin. Once a line is selected a determination is made to determine whether the merit value corresponding to the selected line is greater than the merit threshold value. If the merit value of the line is greater than the threshold the line is considered to contain detail and the value of the bin is incremented by one.

In the next step 509 it is determined if there are any further lines within the bin to be analysed and if there are further lines to be analysed processing returns to step 506 and continues in the manner described above until all lines within the bin have been analysed. Once all the lines within a bin have been analysed the bin value will equal the number of lines within the bin area that contain image detail. At this point the process continues at step 510 where it is determined if there are any bins left in the swathe that have not been analysed. If it is determined that there are bins remaining to be analysed processing returns to step 505 where the next bin to be analysed in the swathe is selected and processing continues as outlined above. If it is determined that there are no more bins remaining to be analysed within the swathe of interest then the detail value for the swathe is calculated in step 511. The detail value is calculated as the sum of all the bin values within the swathe of interest. Processing then proceeds to step 512 where it is determined whether any swathes are remaining that have not yet had detail values calculated. If it is determined that there are swathes remaining then processing returns to step 504 and processing continues as before otherwise the calculation of detail values ends or finishes.

Figure 7A:
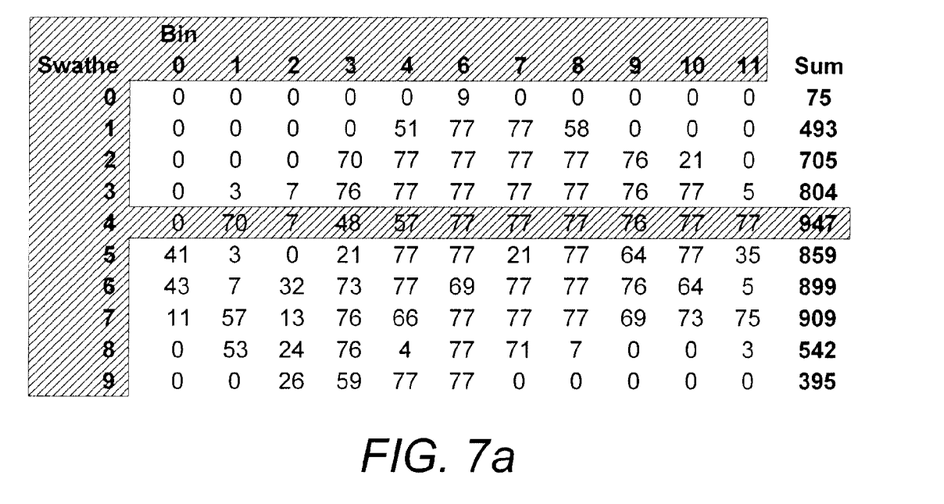
FIG. 7a is a table of bin values corresponding to the image of FIGS. 4 and 6.

Once all the detail values have been calculated a histogram table will have been calculated containing bin values for each bin in each swathe along with detail values equal to the total of the bin values in a corresponding swathe. An example of a table values generated for the image shown in FIGS. 4 and 6 is given in FIG. 7a. In the example table shown swathe 4 has the highest detail value equal to the sum of its bin values. In this example, therefore, swathe 4 would be selected as the first swathe. Note that the maximum bin value is equal to 77 which corresponds with the total number of lines within a bin.

In addition to determining the order in which the swathes should be scanned the swathe order processing unit 204 is also operable to calculate a seed focus position for each swathe. The seed focus position is a position within the swathe that should provide enough image detail in order that the auto-focus procedure used to initialise the dynamic focus can be executed effectively. An example of such a dynamic focus system is described in co-pending U.S. application Ser. No. 12/121,830 titled 'A method and system for controlling the position of a microscope lens'. This can be done, for example, before executing step 307 of the scanning process shown in the flowchart of FIG. 3. The processing performed to determine the seed focus positions is set out in the flow chart shown in FIG. 8. The first step 801 is to identify the first bin in the swathe having strong detail. What is considered strong detail in this context is if the bin has a bin value greater than one third of the total number of lines in the bin. The bins are analysed starting from the bin at the top of the image and the bin value is compared with the strong detail value. If it is determined that the bin value is greater than the strong detail value then that bin can be used as the starting point for finding the seed focus position and processing continues to step 802. In the next step the bin is analysed line by line to determine the first line in the bin having a merit value greater than the merit threshold value wherein the relevant values are those determined in respective steps 501 and 502 performed as part of the calculation of the detail values. The lines are analysed from the first line to the last line of the bin and the analysis stops once a line having a merit value greater than the merit threshold is identified at which point processing proceeds to step 803.

Figures 8, 9:
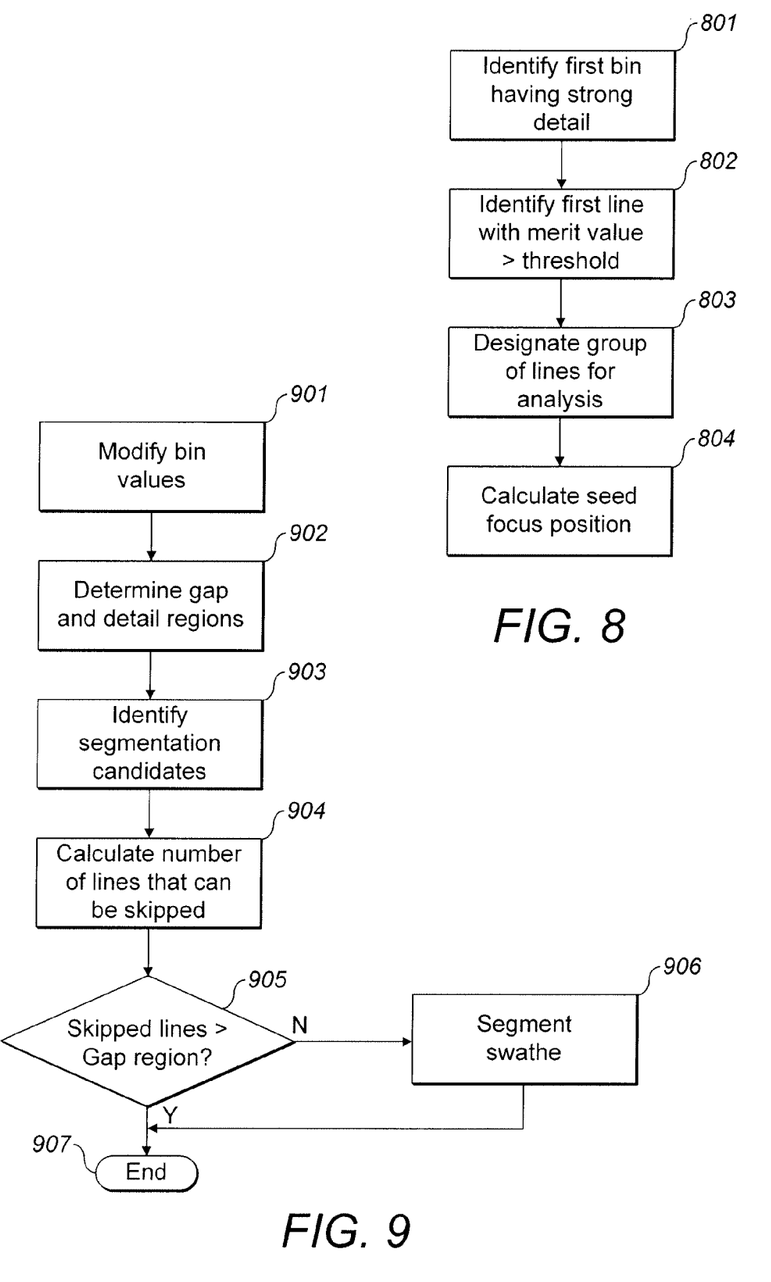
FIG. 8 is a flow chart showing the steps performed in calculating a seed focus position for a swathe.
FIG. 9 is a flow chart showing the steps performed in determining whether a swathe requires segmentation.

The identified line is used as the starting point for determining a group of lines to be used in the calculation of the position of the line to be utilised as the seed focus position. In particular, the group of lines beginning with the start line identified in step 802 and ending with the line offset from the start line by the number of lines in a bin is utilised for the calculation step in 804. The calculation is performed by firstly determining which of the lines within the group of lines identified in step 803 has a merit value greater than the merit value. Only the lines having a merit value higher than the threshold are used for the determining the seed focus position. The offset of the seed focus position relative to the start line is calculated by evaluating the following equation:

$$focusoffset = \frac{\sum_{i=0}^{i=numLinesPerBin-1} mv_i * offset_i}{\sum_{i=0}^{i=numLinesPerBin-1} mv_i} \quad (2)$$

wherein,

'meritvalue$_i$' is the merit value of the i$_{th}$ line identified as having a merit value higher that the merit threshold value, mv$_i$=1 if meritvalue$_i$>threshold otherwise mv$_i$=0, 'offset$_i$' is an offset relative to the start line for the i$_{th}$ line given as the number of lines below the start line, and 'focusoffset' is the seed focus position offset given as the number of lines below the start line.

The focusoffset value may not be an exact integer in which case it is rounded up or down to the nearest integer value. The actual autofocus position for the swathe is the line number of the start line plus the focusoffset value calculated according to equation 2. The processing steps 801 to 804 are then repeated for each swathe in the selected image area so that each swathe has an associated seed focus position.

In a further embodiment in addition to dividing the image into swathes for scanning the system is operable to further divide each swathe into a number of separately scanable segments. This is advantageous because the dynamic focus system may not be able to maintain good focus when there are large gaps between image detail areas within a swathe. Thus, it is preferable to re-start the dynamic focus procedure after the gap by auto-focussing at a seed focus position within the next scanable segment.

The procedure for determining whether a swathe needs to be segmented is set out in FIG. 9. The first step 901 involves modifying the histogram data so that some contribution from previous swathes is included in the histogram data of the swathe being analysed for segmentation. This is desirable so as to avoid any unnecessary swathe segmentation which would unnecessarily increase the scanning time. This is achieved by, starting with the swathe to the left of the first swathe, adding the histogram data from the previous swathe to the swathe of interest. By repeating step 901 for all swathes the values of the previous swathes propagates through the histogram data. The histogram data is modified according to the following equation:

modifiedhistogramdata[bin]= histogramdata[swathe][bin]+modifiedhistogramdata[bin−1]*alpha   (3)

wherein, modifiedhistogramdata[bin] is the value of the histogram bin once modified, histogramdata[swathe][bin] is the original histogram data indexed by swathe and bin number respectively, and alpha is a constant.

Figure 7B:
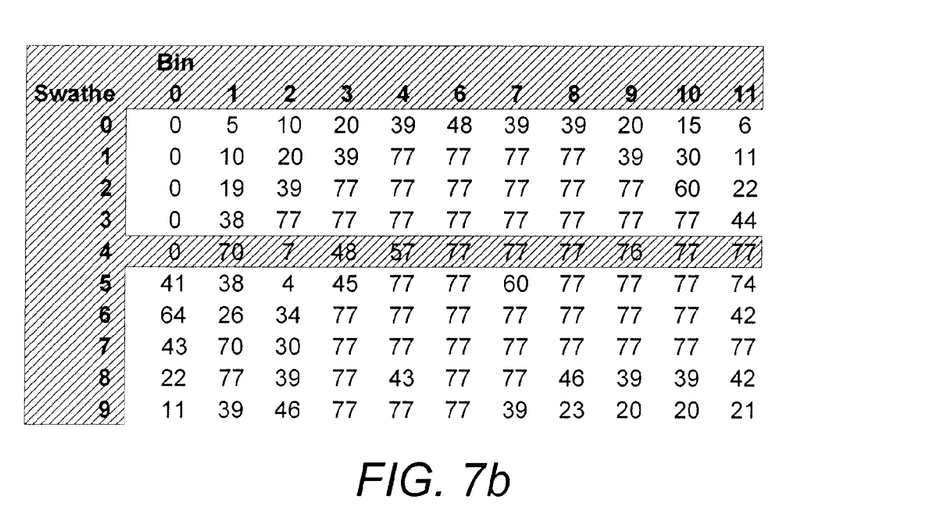
FIG. 7b is a table of modified bin values suitable for performing a segmentation analysis corresponding to the image of FIGS. 4 and 6.

In this embodiment alpha is chosen to have a value of 0.5 meaning that a contribution of 50% of the previous swathes histogram data is added to the current swathe. As will be appreciated other values of alpha are possible. As an example, FIG. 7b shows the histogram data after modification. The modification is done in two parts, processing to the left of the seed swathe and processing to the right of the seed swathe. A proportion of seed swathe (swathe 4 in this example) histogram data is added to the histogram data of swathe 5 and a proportion of modified swathe 5 data is added to the histogram data of swathe 6 and so on. The process continues until the left edge of the slide is reached. Next a proportion of the histogram data of swathe 4 is added to the histogram data of swathe 3 and a proportion of the modified histogram data of swathe 3 is added to the histogram data of swathe 2. Processing continues in this manner until the right edge of the slide is reached. Should a modified bin value exceed the number of lines in a bin then it is automatically clipped to be made equal to the number of lines in a bin.

Once the histogram data has been modified it is then analysed in step 902 to determine regions of detail and regions that are gaps. This is done on a swathe by swathe basis. The values of each bin in the swathe of interest are compared with a fixed threshold value which in this embodiment is equal to 10% of the total number of lines in a bin. If the bin value is higher than the threshold then the bin is assigned as a detail bin and if lower it is assigned as a gap bin. Once this has been done for all bins then adjacent gap and detail bins are grouped together and designated as gap and detail regions. This gives a list comprising gap and detail regions (e.g. gap, detail, gap . . . ) along with the number of bins associated with each region. In the next step 903 the list is analysed to determine instances where there is a pattern of regions designated detail/gap/detail. Such a pattern suggests a potential area for segmentation but in order to determine whether it should be segmented a measure of the amount of lines with no detail which can skipped without the need for segmentation needs to be calculated. This is performed in step 904 by taking the number of detail lines in the preceding detail region (i.e. the sum of the bin values in the detail region) and multiplying it by a constant which in this embodiment is equal to 0.8. The resulting value gives the number of lines which can be safely ignored or skipped without needing to start a new segment.

The calculated value is then compared with the size of the gap region and if the number of lines is greater than the gap region then it is determined that no segmentation is required. However, if the number of lines is less than the gap region then the swathe is segmented. The swathe is segmented in step 906 by designating the gap/detail area following the first detail region as a new segment. Each segment will have its own auto-focus position calculated in accordance with the process set out in FIG. 8 wherein determination of the first bin will be the first bin in the segment being analysed rather than the swathe. Similarly when scanning the selected image should a swathe have been segmented then each segment will be scanned separately with auto-focusing occurring at each segment.

Figure 10:
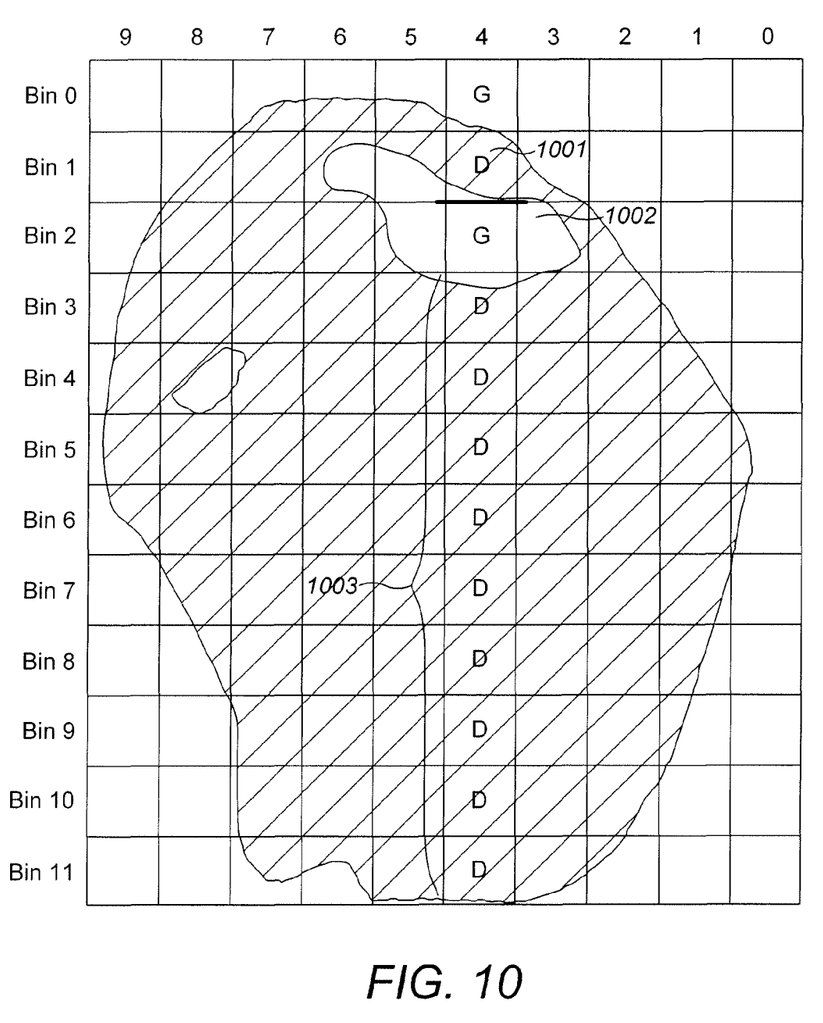
FIG. 10 is a drawing of an image corresponding to the image of FIGS. 4 and 6 further showing the segmentation of one of the swathes.

Taking swathe 4 of the modified histogram table of FIG. 7b as an example, bin 0 would be designated a gap region, bin 1 would be designated a detail region, bin 2 a gap region and bins 3 to 11 a detail region. Thus, the list would be gap, detail, gap, detail and the associated bins 1,1,1,9 respectively. This is illustrated further in FIG. 10 using the example image shown previously in FIGS. 4a and 6. The detail 1001, gap 1002, detail 1003 pattern of regions indicate a potential area for segmentation and thus the number of lines that can be skipped would be calculated based on the bin value of bin 1. Bin 1 has a value of 70 and the number of lines that can be skipped would be equal to 80% of that value which gives 56 lines. This is not enough to bridge the single gap bin 1002 separating the detail regions 1001 and 1003 and thus the swathe would be segmented. The new segment would be designated as beginning at the first line of the gap bin which is this example is bin 2. The swathe would comprise two segments the first comprising bins 0 and 1 and the second segment comprising bins 2 to 11 (the boundary between the segments is indicated by the bold line 1004 in FIG. 10).

In the above embodiments an auto-focus procedure is carried out at every swathe (or swathe segment if appropriate) proceeding from the determined first swathe. This has the advantage that any dynamic focus procedure used will achieve a particularly good focus across the image at a higher speed than just scanning left to right across the area of interest. In a further embodiment the speed and productivity of the scanner is further improved by omitting the auto-focus step after the first swathe. Alternatively only some of the auto-focus steps are omitted with the number of swathes in which auto-focus is required depends on the nature of the image being scanned and the focus quality required.

Although the embodiments of the invention described above comprise computer apparatus and processes performed in computer apparatus, it will be appreciated that the invention also extends to computer programs, particularly computer programs on or in a carrier adapted for putting the invention into practice. The program may be in the form of source or object code or in any other form suitable for use in the implementation of the processes according to the invention. The carrier can be any entity or device capable of carrying the program.

For example, the carrier may comprise a storage medium such as a ROM, for example a CD-ROM, a semiconductor ROM or a magnetic recording medium, for example a floppy disc or hard disc. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of the relevant processes.

The invention claimed is:

1. A method of scanning a microscope slide comprising:
    scanning a predetermined area of a microscope slide to generate an overview image;
    dividing said overview image into a plurality of adjacent swathes each swathe having a length equal to the length of the predetermined area and a predetermined width;
    calculating for each swathe a detail value that relates to the level of image detail in the swathe;
    determining which swathe has the largest detail value and designating the swathe having the largest detail value as a first swathe;
    further scanning the predetermined area by scanning the first swathe and subsequently scanning the remaining swathes in a predetermined order relative to the first swathe.

2. A method according to claim 1 wherein said predetermined order comprises starting at the first swathe sequentially scanning each swathe located to the left of the first swathe from right to left and then sequentially scanning each swathe to the right of the first swathe from left to right.

3. A method according to claim 1 further comprising determining a seed focus position for each swathe and wherein further scanning the predetermined area further comprises focusing at the determined seed focus position of at least the first swathe.

4. A method according to claim 3 wherein further scanning the predetermined area comprises focusing at the corresponding seed focus position of every swathe to be scanned.

5. A method according to claim 1 wherein calculating a detail value comprises:
    calculating a merit value for each line of pixels in each swathe in the overview image;
    calculating a merit threshold value equal to the average merit value of every line of every swathe in the overview image;
    dividing each swathe into a plurality of adjacent areas each area having a predetermined number of lines and an associated area value;
    determining for each line in each area whether the line has a merit value higher than the merit threshold value;
    incrementing an area value by one if it is determined that a line in the area has a merit value higher than the merit threshold value;
    calculating a detail value for each swathe equal to the sum of the area values corresponding to the swathe.

6. A method according to claim 5 wherein the merit values are calculated according to the following equation:

$$meritvalue[\text{swathe}][\text{line}] = \sum_{n=0}^{n=w-2} (C_{n+1} - C_n)^2 + 765 - R_n - G_n - B_n$$

wherein,
    'swathe' is a number identifying a swathe being analysed,
    'line' is a number identifying a line within the swathe being analysed,
    'n' is a number of a pixel within the line,
    'w' is the total number of pixels in the line,
    '$R_n$', '$G_n$' and '$B_n$' are respective red, green and blue 8-bit colour channel values for the nth pixel, and
    '$C_n$' is a red or green or blue 8-bit colour channel value for the nth pixel.

7. A method according to claim 5 wherein the merit values are calculated according to the following equation:

$$meritvalue[\text{swathe}][\text{line}] = \sum_{n=0}^{n=w-2} (C_{n+1} - C_n)^2$$

wherein,
    'swathe' is a number identifying a swathe being analysed,
    'line' is a number identifying a line within the swathe being analysed, 'n' is a number of a pixel within the line,
'w' is the total number of pixels in the line,
'$C_n$' is a red or green or blue 8-bit colour channel value for the nth pixel.

8. A method according to claim 5 wherein the merit values are calculated according to the following equation:

$$meritvalue[swathe][line] = \sum_{n=0}^{n=w-2} C_n - M_n - Y_n \quad (1b)$$

wherein,
'swathe' is a number identifying a swathe being analysed,
'line' is a number identifying a line within the swathe being analysed,
'n' is a number of a pixel within the line,
'w' is the total number of pixels in the line, and
$C_n$, $M_n$, $Y_n$ are subtractive primaries cyan, magenta and yellow for the nth pixel.

9. A method according to claim 5 wherein the merit values are calculated utilising a transform calculated as $255-R_n$ or $255-G_n$ or $255-B_n$ for each pixel wherein n is the number of a pixel within a line of a swathe being analysed.

10. A method according to any of claim 5 wherein determining a seed focus position of a swathe comprises:
identifying the first area in the swathe that has an area value higher than a strong detail threshold;
identifying the first line of the identified area having a merit value higher than the merit threshold value;
designating a group of lines comprising the identified first line and the subsequent lines up to and including a line offset from the first line by the total number of lines in an area;
determining for every line in the group whether the merit value is greater than the merit threshold and if it is determined that the merit value is greater than the merit threshold then utilising the offset of the line relative to the first line and the merit value of the line to calculate the seed focus position.

11. A method according to claim 10 wherein the strong detail threshold is equal to one third of the number of lines in an area.

12. A method according to claim 10 wherein calculating the seed focus position comprises evaluating the following equation:

$$focusoffset = \frac{\sum_{i=0}^{i=numLinesPerBin-1} mv_i * offset_i}{\sum_{i=0}^{i=numLinesPerBin-1} mv_i}$$

wherein,
'$meritvalue_i$' is the merit value of the $i_{th}$ line identified as having a merit value higher that the merit threshold value,
'$mv_i$'=1 if $meritvalue_i$>threshold otherwise '$mv_i$'=0,
'$offset_i$' is an offset relative to the start line for the $i_{th}$ line given as the number of lines below the start line, and
'focusoffset' is the seed focus position offset relative to the start line given as the number of lines below the start line.

13. A method according to claim 1 further comprising:
analysing each swathe to determine if there is a gap area between areas having detail;
dividing the swathe into a plurality of scanable segments where it is determined that said gap area exists; and
wherein scanning the swathes of the predetermined area comprises individually scanning each segment in a swathe.

14. A method according to claim 13 wherein analysing each swathe comprises:
designating areas of the swathe having a value above a fixed threshold value as detail areas;
designating areas having a value less than the fixed threshold value as gap areas;
grouping adjacent detail areas to form detail regions;
grouping adjacent gap areas to form gap regions;
calculating a number of lines that can be skipped without the need to designate a new segment equal to the total area values of a detail region multiplied by a skip multiplier value;
segmenting the swathe if it is determined that the line corresponding to the last line of the detail region plus the calculated number of lines that can be skipped is positioned within a gap region and wherein the swathe is segmented such that a new segment is designated starting at the first line of the gap region.

15. A method according to claim 14 wherein said skip multiplier value is equal to 80%.

16. A method according to claim 13 wherein the area values of a current swathe being analysed for segmentation are modified before designation as detail or gap areas by adding a proportion of corresponding bin values from a previous swathe to the area values of the current swathe wherein said corresponding area values of the previous swathe may have been modified previously.

17. A method according to claim 16 wherein said proportion is equal to 50% of the value of the bin values of the previous swathe.

18. Apparatus for controlling a microscope to scan a microscope slide comprising:
a scanner operable to scan a predetermined area of a microscope slide to generate an overview image;
a divider operable to divide an overview image into a plurality of adjacent swathes each swathe having a length equal to the length of the predetermined area and a predetermined width;
a detail value calculator operable to calculate for each swathe in an overview image a detail value that relates to the level of image detail in the swathe;
a determinator operable to determine which swathe in an overview image has the largest detail value and designating the swathe having the largest detail value as a first swathe;
wherein the scanner is further operable to scan the predetermined area by scanning a first swathe and subsequently scanning the remaining swathes in a predetermined order relative to the first swathe.

19. Apparatus according to claim 18 wherein the predetermined order scanned by the scanner comprises starting at a first swathe sequentially scanning each swathe located to the left of the first swathe from right to left and then sequentially scanning each swathe to the right of the first swathe from left to right.

20. Apparatus according to claim 18 further comprising a seed focus determinator operable to determine a seed focus position for each swathe; and wherein the scanner is further operable to focus at a determined seed focus position of at least a first swathe when scanning the predetermined area.

21. Apparatus according to claim 20 wherein the scanner is further operable to focus at a corresponding seed focus position of every swathe to be scanned when scanning the predetermined area.

22. Apparatus according to claim 18 wherein the detail value calculator comprises:
a merit value calculator operable to calculate a merit value for each line of pixels in each swathe of an overview image;
a merit threshold value calculator operable to calculate a merit threshold value equal to the average merit value of every line of every swathe in an overview image;
a swathe divider operable to divide each swathe of an overview image into a plurality of adjacent areas each area having a predetermined number of lines and an associated area value;
a merit determinator operable to determine for each line in each area of an overview image whether the line has a merit value higher than the merit threshold value;
an area value incrementor operable to increment an area value by one if it is determined that a line in the area has a merit value higher than the merit threshold value;
an adder operable to calculate a detail value for each swathe in an overview image equal to the sum of area values corresponding to the swathe.

23. Apparatus according to claim 22 wherein the merit value calculator is operable to calculate merit values according to the following equation:

$$meritvalue[\text{swathe}][\text{line}] = \sum_{n=0}^{n=w-2} (C_{n+1} - C_n)^2 + 765 - R_n - G_n - B_n$$

wherein,
'swathe' is a number identifying a swathe being analysed,
'line' is a number identifying a line within the swathe being analysed,
'n' is a number of a pixel within the line,
'w' is the total number of pixels in the line,
'$R_n$', '$G_n$' and '$B_n$' are respective red, green and blue 8-bit colour channel values for the nth pixel, and
'$C_n$' is a red or green or blue 8-bit colour channel value for the nth pixel.

24. Apparatus according to claim 22 wherein the merit value calculator means is operable to calculate merit values according to the following equation:

$$meritvalue[\text{swathe}][\text{line}] = \sum_{n=0}^{n=w-2} (C_{n+1} - C_n)^2$$

wherein,
'swathe' is a number identifying a swathe being analysed,
'line' is a number identifying a line within the swathe being analysed,
'n' is a number of a pixel within the line,
'w' is the total number of pixels in the line,
'$C_n$' is a red or green or blue 8-bit colour channel value for the nth pixel.

25. Apparatus according to claim 22 wherein the merit value calculator is operable to calculate merit values according to the following equation:

$$meritvalue[\text{swathe}][\text{line}] = \sum_{n=0}^{n=w-2} C_n - M_n - Y_n \qquad (1b)$$

wherein,
'swathe' is a number identifying a swathe being analysed,
'line' is a number identifying a line within the swathe being analysed,
'n' is a number of a pixel within the line,
'w' is the total number of pixels in the line, and
$C_n$, $M_n$ and $Y_n$ are subtractive primaries cyan, magenta and yellow for the nth pixel.

26. Apparatus according to claim 22 wherein the merit value calculator is operable to calculate merit values utilising a transform calculated as $255\text{-}R_n$ or $255\text{-}G_n$ or $255\text{-}B_n$ for each pixel wherein n is the number of a pixel within a line of a swathe being analysed.

27. Apparatus according to claim 22 wherein the seed focus determinator comprises:
a strong detail identifier operable to identify the first area in a swathe that has an area value higher than a strong detail threshold;
a first line identifier operable to identify a first line of an identified first area having a merit value higher than a merit threshold value;
a group designator operable to designate a group of lines comprising an identified first line and subsequent lines up to and including a line offset from the first line by the total number of lines in an area;
seed focus position calculation operable to determine for every line in a designated group whether a corresponding merit value is greater than a merit threshold value and if it is determined that the merit value is greater than the merit threshold value then utilising the offset of the line relative to the first line of the group and the merit value associated with the line to calculate the seed focus position.

28. Apparatus according to claim 27 wherein the strong detail identificator utilises a strong detail threshold equal to one third of the number of lines in an area.

29. Apparatus according to claim 27 wherein the seed focus position calculator is operable to calculate the seed focus position by evaluating the following equation:

$$focusoffset = \frac{\sum_{i=0}^{i=numLinesPerBin-1} mv_i * offset_i}{\sum_{i=0}^{i=numLinesPerBin-1} mv_i}$$

wherein,
'$meritvalue_i$' is the merit value of the $i_{th}$ line identified as having a merit value higher that the merit threshold value,
'$mv_i$'=1 if $meritvalue_i$>threshold otherwise '$mv_i$'=0,
'$offset_i$' is an offset relative to the start line for the $i_{th}$ line given as the number of lines below the start line, and
'focusoffset' is the seed focus position offset relative to the start line given as the number of lines below the start line.

30. Apparatus according to claim 18 further comprising:
a gap determinator operable to analyse each swathe in a predetermined area to determine if there is a gap between areas containing image detail;

a swathe divider operable to divide a swathe into a plurality of scanable segments where it is determined that gap areas exist; and wherein the scanner is further operable to individually scan each segment in a swathe when scanning a selected area.

31. Apparatus according to claim 30 wherein the gap determinator comprises:

a detail area designator operable to designate areas of a swathe having a value above a fixed threshold value as detail areas;

a gap area designator operable to designate areas of a swathe having a value less than the fixed threshold value as gap areas;

a detail grouper operable to group adjacent detail areas in a swathe to form detail regions;

a gap grouper means operable to group adjacent gap areas in a swathe to form gap regions;

a line skip calculator operable to calculate a number of lines that can be skipped without the need to designate a new segment by calculating a sum of the area values associated with the areas comprising a detail region multiplied by a skip multiplier value;

a segmentor operable to segment a swathe if it is determined that a line corresponding to the last line of a detail region plus a calculated number of lines that can be skipped is located within a gap region and wherein the swathe is segmented such that a new segment is designated starting at the first line of the gap region.

32. Apparatus according to claim 31 wherein said skip multiplier value is equal to 80%.

33. Apparatus according to claim 30 further comprising an area value modifier operable to modify the area values of a current swathe being analysed for segmentation before designation as detail or gap areas by adding a proportion of corresponding bin values from a previous swathe to the area values of the current swathe wherein said corresponding area values of the previous swathe may have been modified previously.

34. Apparatus according to claim 33 wherein said proportion is equal to 50% of the value of the bin values of the previous swathe.

35. A non-transitory computer-readable medium storing computer executable instructions for causing a programmable computer to control a microscope in accordance with the method of claim 1.

* * * * *